June 4, 1968 F. CHERNOW 3,387,271

SIGNAL DISTRIBUTION SYSTEM HAVING A VOLTAGE VARIABLE CAPACITIVE DISTRIBUTION LAYER

Filed Oct. 26, 1964 4 Sheets-Sheet 1

INVENTOR.
FRED CHERNOW

BY Sughrue, Rothwell, Mion, Zinn, & Macpeak
ATTORNEYS.

INVENTOR.
FRED CHERNOW

BY Sughrue, Rothwell, Mion, Zinn & Macpeak
ATTORNEYS.

June 4, 1968 F. CHERNOW 3,387,271

SIGNAL DISTRIBUTION SYSTEM HAVING A VOLTAGE VARIABLE CAPACITIVE DISTRIBUTION LAYER

Filed Oct. 26, 1964 4 Sheets-Sheet 3

INVENTOR.
FRED CHERNOW

BY Sughrue, Rothwell, Mion, Zinn, & Macpeak
ATTORNEYS.

INVENTOR.
FRED CHERNOW

BY Sughrue, Rothwell, Mion, Zinn & Macpeak
ATTORNEYS

United States Patent Office 3,387,271
Patented June 4, 1968

3,387,271

SIGNAL DISTRIBUTION SYSTEM HAVING A VOLTAGE VARIABLE CAPACITIVE DISTRIBUTION LAYER

Fred Chernow, Burlington, Mass., assignor to Electro-Tec Corp., Ormond Beach, Fla.

Filed Oct. 26, 1964, Ser. No. 406,524
18 Claims. (Cl. 340—166)

ABSTRACT OF THE DISCLOSURE

An AC energizing signal is applied selectively to an electroluminescent layer or other threshold responsive layer by means of a material having a DC voltage versus admittance characteristic which reaches a sharp peak at one point of voltage. With the utilization layer and the peaking material electrically connected, a DC field gradient placed along the peaking material via a resistive layer puts only a select point of the peaking material at the special point of voltage. The latter point of voltage can be moved by raising or lowering the level of the gradient. An AC signal which is applied across the combination of layers and insulated from the gradient passes through the peaking or high admittance point of the peaking material to energize a corresponding point of the utilization layer.

The invention relates to signal distribution systems. More particularly, the invention relates to signal distribution systems for supplying a signal to discrete positions on a panel-type display device.

The prior art has shown that there have been many attempts to find a panel-type display device to replace the complex and bulky mechanisms of a cathode ray tube. The essential components of any display device, including a cathode ray tube, include a signal distribution means and a light producing means. In the cathode ray tube, the signal distribution means is the well-known electron beam scanning system. The light producing means is the phosphor coated glass which provides light output in response to the impinging electron beam.

In prior art panel-type displays, electroluminescent panels have been proposed for the light producing means. It has been a greater problem to find a suitable distribution means for distributing the information to the EL panel. One manner in which signals may be distributed to the electroluminescent panel is by providing a matrix of crossed grids across the panel. By selecting a single horizontal and vertical grid for the application of the signal, a light output appears on the electroluminescent panel at the intersection of the two selected grids. One problem with this type of system is that each selected line, whether a horizontal line or vertical line, causes a certain amount of energy to be applied to the electroluminescent panel at places other than the selected spot, thus causing undesired illumination of certain portions of the electroluminescent panel. A second problem with the crossed grid type of signal distribution means is that it is necessary to provide a complex commutating system for selecting the proper grids in sequential order so that a TV type of scan may be achieved.

Another type of solid state display is the so-called ELF display disclosed by E. A. Sack on page 1694 of the October 1958 IRE Proceedings. In the ELF display commutating mechanism is used to distribute the light producing signal to crossed grids which are placed on a panel composed of a ferroelectric material and an electroluminescent material. The ferroelectric material has a dielectric constant which varies with the applied DC voltage, and for a specific DC voltage the material has a peak value of dielectric constant. By selecting single horizontal and vertical crossed grids and causing the voltage between the two selected grids to be at the specific value which will cause the ferroelectric material to peak, the light producing signal will pass through the ferroelectric material only at the point of grid intersection and illuminate the electroluminescent panel at a point which is adjacent thereto. This type of system solves the problem of unwanted illumination on the electroluminescent panel at points other than the desired point. However, there is still the necessity of a complex commutating means for providing proper selection of the individual grid lines.

A further type of prior art solid state display panel includes an EL layer and a ferroelectric layer which has a voltage gradient applied thereacross. A resistive coating is placed on one side of the ferroelectric layer and a battery is connected between the two ends of the resistive coating. This combination provides a voltage drop along the length of the ferroelectric layer. The electroluminescent layer is placed adjacent to the other side of the ferroelectric layer and a conductor is placed adjacent to the electroluminescent layer. This configuration allows a voltage gradient to be applied across the entire sandwich. The ferroelectric layer has a dynamic peaking characteristic which is used in the prior art device for causing incremental areas of the ferroelectric material to exhibit a high dielectric constant and thus pass the signal therethrough to illuminate the electroluminescent panel. As the voltage across any elemental area of the ferroelectric layer is increased by an increasing bias applied to one end of the resistive coating, the voltage reaches the coercive point for the ferroelectric material. When the coercive point is reached the ferroelectric layer switches its remnant states and passes through a range of high dielectric constant. It is to be noted that the dynamic peaking characteristic operation only allows the ferroelectric material to dynamically pass through a range of high dielectric constant. Thus a static display such as would be necessary for metering or measuring applications cannot be achieved without complex external circuit mechanism. A further disadvantage of the latter prior art type of solid state display is that the light producing signal must be small with respect to the coercive voltage of the material used. The variable voltage provides the necessary sweeping means to sweep the dynamic peaking characteristic along a length of the ferroelectric material, and if the light producing signal were large, the variable voltage would be masked. If the variable voltage signal were masked by the large light producing signal there would be insufficient resolution.

A further disadvantage of the prior art display lies in the fact that the FE material is switched from a first remnant state in order to pass through the high dielectric region. Consequently, when a scan is completed the entire FE material is in the second remnent state and must be returned to the first remnent state prior to the start of a second sweep. Large currents are necessary to switch the material back to the first remnant state during the flyback time thus creating an increase in power consumption.

Another disadvantage of the prior art system is that the sweep speed is limited by the domain wall motion of the FE material used. At present, no FE materials are known which have domain wall motion that is fast enough to allow sweeping at speeds necessary for television applications.

Still a further disadvantage of the prior art device is that the resistive coating or layer must have relatively small total resistance so as not to create a large voltage drop in the AC signal which is applied to the FE and EL layers via the resistive layer. Consequently, if a large DC signal were applied across the layer to achieve increased resolution, the $I^2R$ power loss would be great due to an increase in current. Thus, a low resistance layer limits the magnitude of DC bias. Since the resolution is dependent on the DC bias, it can be said that the use of a low resistance limits the resolution of the system to a relatively small number of lines per display.

The above limitations and disadvantages are overcome by the present invention by providing a layer of material which produces light in response to an applied signal, a layer of material having a static electrical peaking characteristic for distributing the signal to the light producing layer, a relatively large resistance layer for applying a non-zero voltage gradient across the "peaking characteristic" layer, and a pair of electrodes isolated from the resistance layer for applying the signal to the combined layers.

Due to the isolation of the resistance layer from the signal electrodes, there is no drop in signal strength along the length of the layer, thus allowing the use of high ohmic resistance layers. The use of a high ohmic resistance layer in turn allows operation with a lower power loss and at an increased bias voltage drop with its concomitant increase in resolution.

A further advantage of the present invention is that it may be used for static displays. That is, the signal distribution layer is capable of retaining its peak characteristic for a given voltage applied thereacross rather than only being capable of dynamically passing through its peak characteristic. Consequently, an elemental area of the display may be selected for illumination and maintained in its luminescent state whereas in the above-mentioned prior art device the illumination cannot be maintained at a single incremental area.

A further advantage is that it is not necessary that the polarization state of the material (if the material used has any polarization state at all) be changed by scanning. Therefore, there is no need for an additional complex mechanism to reverse the polarity of the scanning voltage or to return the material to its first state of polarization.

An additional advantage is that the sweep speed of the invention is not limited by the domain wall motion.

It is therefore an object of the invention to provide a new type of signal distribution means for distributing a signal to a utilization means.

It is a further object of the invention to provide a panel-type display device which overcomes the limitations of the prior art type of devices.

It is a further object of the invention to provide a panel-type display device which may be used to present either scanning type displays, such as is necessary in television applications, and static type displays, such as is necessary in measuring or metering type applications.

Other objects of the invention will be pointed out in the following description and claims and illustrated in the accompanying drawings, which disclose, by way of example, the principle of the invention and the best mode which has been contemplated of applying that principle.

In the drawings:

FIGURE 1 is a graph of voltage versus dielectric constant helpful in explaining the invention;

FIGURES 2*a*–2*c* are illustrative embodiments of a layer of material used in the invention;

FIGURES 3*a*–3*c* are graphs of voltage versus distance, helpful in explaining the operation of the invention;

Figure 1:
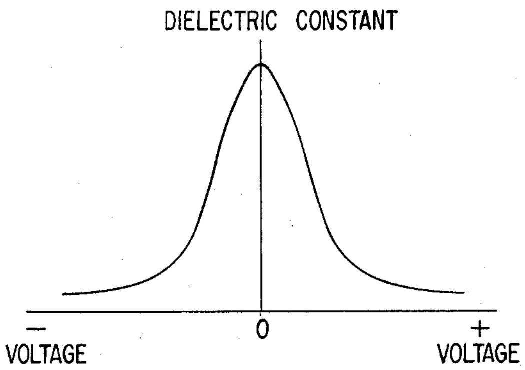

The material used in the invention for distributing the signal to the light producing layer may be any material which exhibits a static electrical peaking characteristic. An example of an electrical peaking characteristic is shown in FIGURE 1. A material having the characteristics shown in FIGURE 1 exhibits a peak dielectric constant (electrical characteristic) for a given value of bias applied to the material. In FIGURE 1, the given value of bias at which the material peaks is shown as 0 volts. For any value of energy other than said given value (in this case 0 volts), the electrical characteristic is less than its peak value. It can be seen in FIGURE 1 that the electrical characteristic peaks at 0 volts and is less than the peak value for any voltage above or less than 0 volts.

A dynamic electrical peaking characteristic is an electrical peaking characteristic similar to that shown in FIGURE 1 which requires the voltage to be swept through the critical voltage in order that the peak may be reached. If the voltage sweep stopped at the critical voltage, the value of the electrical characteristic will drop below the peak value by a substantial amount.

Ferroelectric materials may exhibit a dynamic electrical peaking characteristic. When a time varying voltage is applied across the FE material, the material will exhibit a high dielectric constant as the applied voltage passes through the coercive voltage. However, the high dielectric constant may not be maintained by applying a constant voltage to the material which is equal to the coercive voltage.

A static electrical peaking characteristic is one which allows the peak value of the electrical characteristic to be reached and maintained without the necessity of sweeping through the voltage. For example, if the voltage is stopped at the critical voltage point the electrical characteristic of the material remains at its peak value.

Ferroelectric materials, under conditions explained below, may exhibit static electrical peaking characteristics. In the so-called "static" mode, the material exhibits its highest dielectric constant and highest AC admittance at 0 volts. In this mode, if the DC voltage is maintained at the critical point (here 0 volts), the material continues to exhibit its peak dielectric constant.

Whether or not a ferroelectric material exhibits a dynamic electrical peaking characteristic or a static electrical peaking characteristic depends on the magnitude of the AC signal with respect to the coercive voltage of the material. To exhibit a dynamic electrical peaking characteristic the AC signal must be small compared to the coercive voltage and the temperature must be below the Curie point. To exhibit a static electrical peaking characteristic, the AC voltage must be of the order of magnitude of or large compared to the coercive voltage of the material used.

The peak of electrical quantity (dielectric, capacitance, AC admittance) which is created in the peaking materials used in the invention will be referred to as the static peak. The term static peak is intended to refer only to the peak reached when the material is exhibiting its static electrical peaking characteristic.

If a curve of voltage across the FE material versus dielectric constant is plotted, using a relatively large AC signal for measuring the dielectric constant, the curve appears as is shown in FIGURE 1. For a high negative voltage the dielectric constant has a low value. As the voltage goes toward zero, the dielectric constant increases and reaches a peak value at 0 volts. As the voltage increases in a positive direction away from the zero, or peak point, the dielectric constant again decreases to a low value. Since capacitance is dependent on the dielectric constant of a material, the curve in FIGURE 1 also represents a plot of the capacitance or AC admittance of the peaking material versus applied voltage.

A second type of material which exhibits a static electrical peaking characteristic is composed of back-to-back diodes. The dielectric constant of a diode decreases sharply as the reverse bias on the diode is increased. By placing two diodes back-to-back, a curve of dielectric constant versus voltage such as shown in FIGURE 1 is obtained.

Figure 2A:
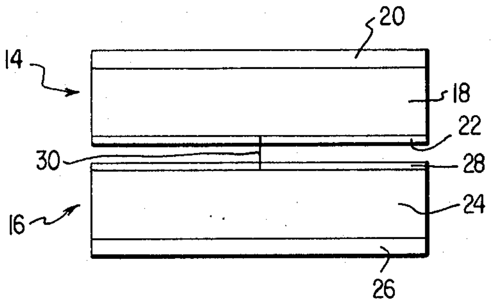
Figure 2B:
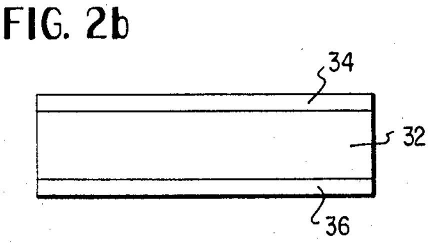

A layer of back-to-back diodes may be formed as shown in FIGURES 2*a* and 2*b*. In FIGURE 2*a*, numeral 14 designates a first layer of diodes composed of a silicon substrate 18 having silicon oxide layer 20 placed thereon by any conventional method. Numeral 16 designates a second layer of diodes composed of a silicon layer 24 having a layer of silicon oxide 26 placed thereon. The two layers of diodes are connected together by electrodes 22 and 28, and electrical connection 30.

FIGURE 2*b* shows a simplified form of back-to-back diode material which is electrically equivalent to that shown in FIGURE 2*a*. A silicon layer 32 has placed thereon two layers of silicon oxide 34 and 36 respectively. It is to be understood that FIGURES 2*a* and 2*b* are only illustrative of one type of back-to-back diode material.

Figure 2C:
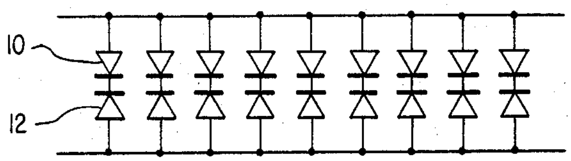

FIGURE 2*c* is a schematic representation of a back-to-back diode material. Numeral 10 designates a first layer of diodes and numeral 12 designates the second layer of diodes.

For ease of explanation, the voltage at which the electrical characteristic of the signal distribution layer peaks will be called the peaking voltage. In both FE layers and back-to-back diode layers the peaking voltage is 0 volts.

To use a material having a static electrical peaking characteristic for a distribution means, it is necessary that the voltages applied to the peaking layer cause only a single incremental area of the layer to peak at any one instance. The incremental area of the layer which peaks, has a dielectric constant which is high enough to allow the AC signal voltages to be substantially passed therethrough to the electroluminescent layer or any other layer to which it is desired to distribute the signal. All incremental areas of the peaking layer except the selected incremental area have a low dielectric constant and will not pass the AC signal to the EL layer. Thus, the signal is passed through an incremental area of the peaking material to a corresponding incremental area of the EL material causing only said corresponding incremental area to produce light. To cause only a single incremental area of the layer to peak, it is necessary that the zero voltage, or peaking voltage, is applied across only one incremental area of the layer. This may be achieved by applying a voltage, gradient across the layer such as shown in FIGURE 3.

Figure 3A:
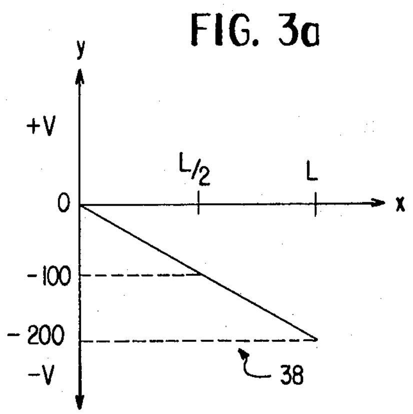

FIGURE 3*a* shows a graph of voltage versus linear distance of the peaking layer. The vertical axis represents the bias voltage applied across the layer and the horizontal axis represents a linear distance along a peaking layer of length L. The values shown in the graph are merely used for purposes of explanation and do not designate the exact values used for any particular peaking material in any particular display system. Line 38 designates the voltage gradient applied to the peaking material. It is noted that the zero voltage is applied to the peaking material only at the point where $X=0$. At any other distance along the peaking material, the voltage applied thereacross is less than zero. For example, at the midpoint, $L/2$, of the layer, the voltage applied thereacross is shown in the graph to be $-100$ volts. At the point on the layer where $X=L$, the voltage applied across the layer is $-200$ volts. Thus, only the incremental area on the layer which corresponds to $X=0$ is subjected to the peaking voltage and thereby exhibits a high dielectric constant. An AC signal applied to the entire layer would substantially pass through only the incremental area represented by $X=0$.

Figure 3B:
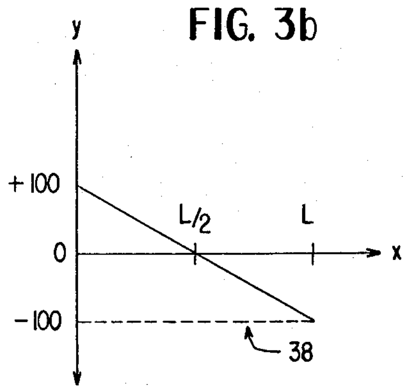

To move the high dielectric point or incremental area of the layer to a different position, it is necessary to raise the level of the gradient 38 such as shown in FIGURE 3*b*. By raising the level of the voltage gradient 38 by 100 volts, the zero or peaking voltage is now applied to the incremental area of the layer at $X=L/2$. Thus, the AC signal will now be passed through only that incremental area of the layer which is exactly at the middle of the layer.

Figure 3C:
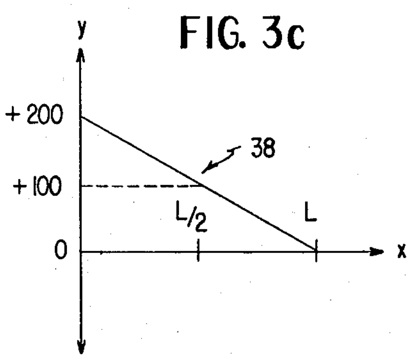

FIGURE 3*c* shows the result when the voltage gradient is raised 200 volts above its original position. The peaking point is now at the position on the layer where $X=L$. Thus, it is possible to move the high dielectric point from the left-hand side of the layer to the right-hand side of the layer by raising the level of the voltage gradient. This is known as scanning. If the electroluminescent layer were placed adjacent to the layer of peaking material, the AC signal would be supplied through the peaking material to successive incremental portions of the EL material causing a line of light to be swept across the face of the EL material.

It should be noted that the curve of voltage versus distance has a non-zero slope. The slope is known as the voltage gradient. It is necessary that a non-zero voltage gradient be applied to the peaking material, otherwise, more than one point on the material would see the critical voltage.

Figures 4, 5, 6:
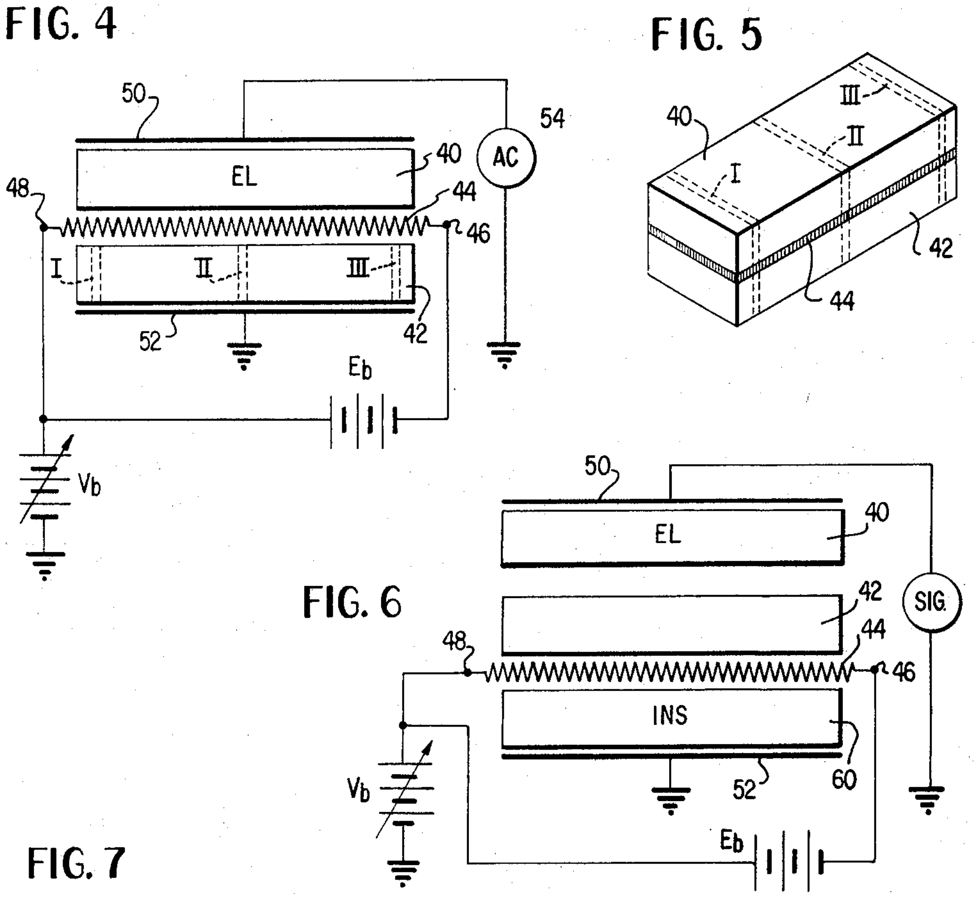
FIGURE 4 is one preferred embodiment of the invention.
FIGURE 5 is a perspective view of a portion of FIGURE 4.
FIGURE 6 is illustrative of another embodiment of the invention.

A preferred embodiment for carrying out the distribution of a signal is shown in FIGURE 4. An EL layer 40 and a layer of peaking material 42 are separated by a resistance 44. Resistance 44 is connected to a voltage source $E_b$ at points 48 and 46 respectively. Point 48 is connected to the positive side of voltage source $E_b$, and point 46 is connected to the negative side of voltage source $E_b$. A variable voltage source $V_b$ has one end connected to ground and the other end connected to the junction between point 48 and the positive end of voltage source $E_b$. An electrode 50, which for display devices must be a transparent electrode, is placed on the EL layer 40. The electrode is connected to the signal source 54 which is also connected to ground. A second electrode 52 is connected to the peaking layer. Electrode 52 is also grounded thus allowing the signal from signal source 54 to be applied across the entire sandwich of layers. Resistance 44 may be a resistive coating which is deposited on top of the peaking layer. FIGURE 5 shows a perspective view of the sandwich, wherein only the peaking layer, the EL layer, and the resistive coating are shown.

Due to the voltage source $E_b$, there is a voltage drop along resistive layer 44 between points 48 and 46 which is equal to $E_b$. The voltage with respect to ground at point 48 is determined by the variable voltage $V_b$, and the voltage with respect to ground at point 46 is always less than the voltage at point 48 by the value $E_b$. For example, if the voltage source $V_b$ is set at 0 volts, then the voltage at point 48 with respect to ground is 0 volts and the voltage at point 46 with respect to ground is $-E_b$ volts. If voltage source $E_b$ is 200 volts, the voltage across the peaking layer 42 plotted against the distance along the peaking layer from point 48 would be as shown in FIGURE 3*a*. Only the far-left incremental area of the peaking layer, designated by numeral I in FIGURES 4 and 5, would exhibit the peak dielectric constant. Consequently, only at incremental area I would the impedance be low enough to allow the AC signal to illuminate an adjacent incremental area of the EL material. Under these conditions, a line of light would appear on the far left-hand side of the panel.

As $V_b$ is increased, the voltage gradient is raised thus moving the zero point towards the right-hand end of the sandwich. When $V_b$ equals 100 volts, the graph of voltage across the peaking material versus distance along the peaking material is as shown in FIGURE 3*b*. The incremental area on the peaking material designated by numeral II will now peak allowing the AC signal to cause the EL layer to luminesce at an area which is adjacent to the incremental area II.

When $V_b$ equals $E_b$, the graph of voltage across the peaking material versus distance along the peaking layer is as shown in FIGURE 3*c*. Incremental area designated by numeral III peaks causing a line of light to be produced at the far right-hand side of the EL layer.

It can be seen that by varying the voltage source $V_b$ between 0 volts and $E_b$ volts, a line of light is made to sweep across the EL layer from the left-hand side to the right-hand side similar to the one-dimensional sweep on a cathode ray tube. The display device could be used as a meter if the front panel is marked in increments and the voltage $V_b$ is made proportional to the variable which is being measured. Thus the position of the line of light on the display would be indicative of the value of the variable being measured.

For a display which would be useful for TV-type applications, it is necessary that there be a large number of lines per unit length of the display panel. To provide proper resolution between these lines, it is necessary that the incremental area which is next adjacent to the peaking incremental area has a dielectric constant which is too low to allow sufficient AC signal to pass to the EL layer. This may be accomplished by making the resistive layer 44 very high in ohmic value. The use of a resistive layer 44 with a high ohmic value allows a greater $E_b$ to be used wthout creating too much current drain and power loss that would be created by using a low resistance layer. A high voltage $E_b$ is desirable in that it creates a steeper gradient which in turn gives better resolution. This is apparent from a look at FIGURES 3*a* through *c*. The steeper the gradient 38, the greater the difference between voltages across adjacent incremental areas of the peaking layer.

It is also necessary, as shown in FIGURE 4, to apply the signal voltage to the sandwich by means which are insulated from the resistive layer. By insulating resistive layer 44 from electrodes 50 and 52, the sandwich provides sufficient isolation between the bias voltages and the signal voltages to allow proper operation.

In FIGURE 6 there is shown a second embodiment of the invention. The only difference between FIGURE 6 and FIGURE 4 is that in FIGURE 6 the EL layer and peaking layer are not separated by a resistive coating. Rather the resistive coating 44 is placed on the bottom of the peaking layer and is insulated from the signal electrodes 50 and 52 by an insulating layer 60. It should be noted that in FIGURE 6, the EL and peaking layers could be reversed with substantially no change in the system operation.

In FIGURES 4 and 6, the brightness of the display depends upon the magnitude of the signal voltage which is applied across the EL layer. The peaking layer has the effect of depositing the light producing signal onto the EL layer at specific locations corresponding to the peaking location of the peaking layer. The brightness of the display may be modulated in accordance with some incoming information, by modulating the amplitude of the AC signal voltage with that information.

Figures 8, 9:
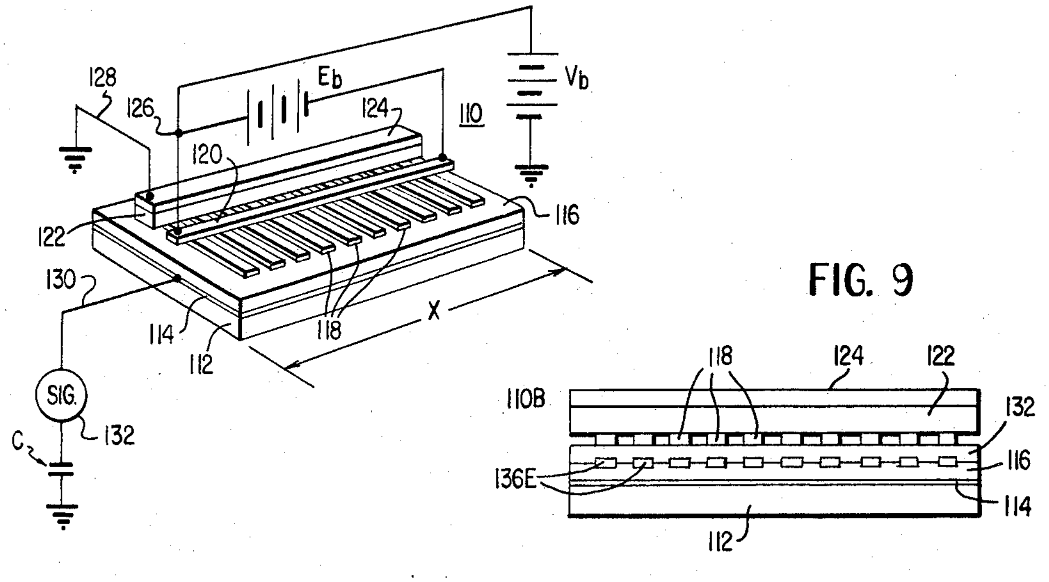
FIGURE 8 is a perspective view of still another embodiment of the invention.
FIGURE 9 is a side view of FIGURE 8 with certain modifications.

FIGURE 8 shows a further embodiment of the one-dimensional scanner which differs from the embodiment shown in FIGURE 4 only in the use of strip electrodes 118. The panel structure 110 includes a transparent base layer 112, such as a glass plate, with a transparent, electrically conductive coating 114 such as tin oxide ($S_nO$) coextensively applied to the interior surface thereof. The entire transparent conductive layer 114 is covered with an electroluminescent layer 116.

Extending across one dimension of the rectangularly-shaped panel 110 on the EL layer 116 are a plurality of electrically conductive strip electrodes 118 which are physically parallel and in close proximity with one another.

In mutual electrical contact with the strip electrodes 118 is the resistive strip 120, which is mutually perpendicular to strip electrodes 118. Also in mutual electrical contact with the strip electrodes 118 is a layer 122 of peaking material, which is mutually perpendicular to the strip electrodes 118 and, therefore, parallel to the high resistive strip 120 and may be positioned adjacent the latter. An electrode 124 is coextensively in contact with the peaking material 122. It is obvious from the drawing that the resistive strip 120 is positioned electrically between the peaking material 122 and the EL material 116 just as is shown in FIGURE 4.

The voltages applied to the panel are the same as is shown in FIGURE 4. The only difference in operation is that in FIGURE 8 when the AC signal passes through the discrete location of the peaking material which is peaking, it is applied to the EL material by an electrode 118 rather than directly through the resistance layer. As voltage $V_b$ is increased, the gradient level is raised such as is shown in FIGURES 3*a* through 3*c*, and the discrete location of the peaking material which exhibits the high dielectric constant moves across the peaking material in the X direction. Consequently, the signal from generator 132 is applied successively across the EL layer 116 by the successive strip electrodes 118.

Figure 7:
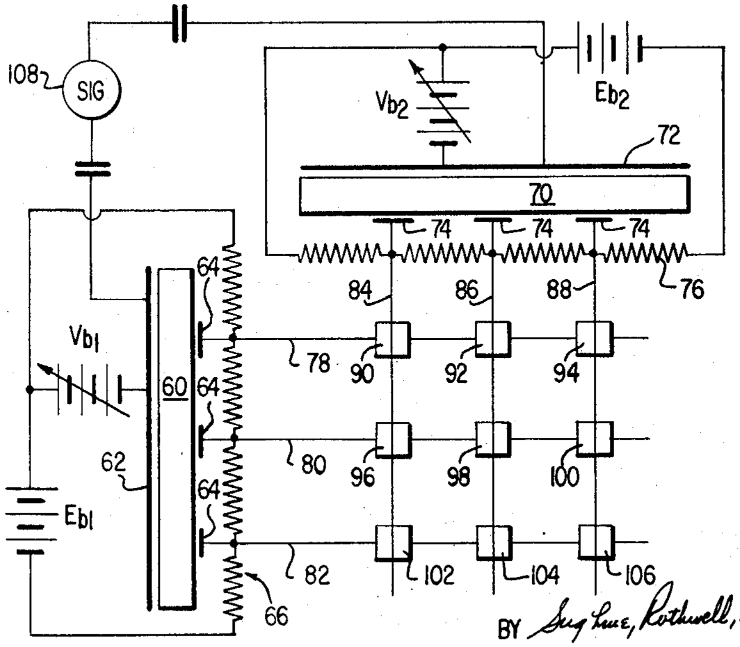
FIGURE 7 is illustrative of an embodiment of the invention used for two-axis scanning.

FIGURE 7 shows an embodiment of the invention in which horizontal and vertical sweeping is achieved. Blocks 90 through 106 represent incremental dot areas on an EL panel. Peaking material 60 distributes the signal successively to horizontal electrode strips 78 through 82. Peaking material 70 distributes the signal successively to vertical electrode strips 84 through 88. By scanning the peaking materials at the proper rates, a raster-type scan may be achieved. Resistance layer 66 and voltage source $E_{b1}$ provide a voltage gradient across peaking layer 60. Resistance layer 76 and voltage source $E_{b2}$ provide a voltage gradient across peaking layer 70. The signal source 108 is connected across the entire structure by electrodes 62 and 72 which are attached respectively to peaking layers 60 and 70. The brightness of the light produced at any point on the display may be varied in accordance with information by modulating the amplitude of the signal source 108 with that information.

In FIGURE 7, the EL material is shown in the form of segmented blocks, however, it is to be understood that a panel of continuous EL material may be used in the configuration. Also, as is well known in the art, a layer of variable resistance material (VR) may be placed over the layer of electroluminescent material to further enhance resolution.

The placement of the VR layer over the EL layer is shown diagrammatically in FIGURE 9 which is a side view of the embodiment shown in FIGURE 8, further including a VR layer. It is seen in the figure that a VR layer 132 is placed between the EL layer 116 and the conductive strips 118. Also, floating electrodes 136E are placed in between the VR layer and the EL layer. It is known in the art that these floating electrodes further prevent spreading of the illumination on the EL layer. It is to be understood, that the use of a VR layer with floating electrodes for enhancing resolution of an EL panel, is known in the art, and forms no part of the instant invention.

Figure 10:
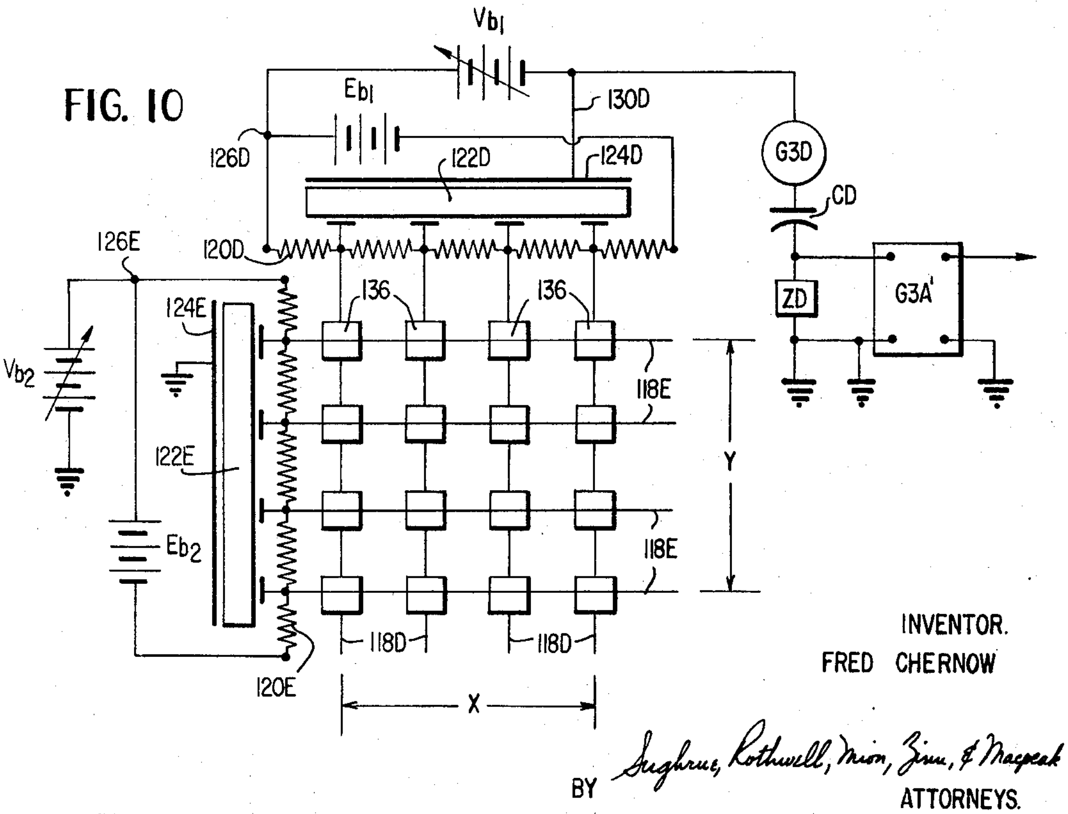
FIGURE 10 is an embodiment of the invention useful for facsimile-type transmission.

A further use of the novel signal distribution, or scanning mechanism, is shown in FIGURE 10, where the figure represents a facsimile-type transmission system. The facsimile-type transmission system differs from the two-dimensional display system in that the combination of the EL panel with the VR panel is replaced by a photoconductive panel (PC) and a VR panel. Also, a layer of capacitive material may be placed in combination with the PC–VR panel or the PC panel alone to further enhance DC signal isolation between the PC material and the DC sources. The photoconductive panel is shown in FIGURE 10 by blocks 136. A block 136 is shown at each crossover point of the vertical and horizontal conductive strips 118*d* and 118*e*. It is understood, however, that the panel may be continuous in form rather than segmented as shown in the figure. The system also includes an impedance ZD and a pickup means G3A′ which picks up the signal across ZD and transmits the signal to any further means such as a transmitter or a display panel.

The facsimile-type transmission system of FIGURE 10 operates as follows. An image is focused onto the photoconductive panel, and as is well-known in the art, the impedance of the photoconductive material is proportional to the light intensity thereon. As the peaking layers 122*d* and 122*e* are scanned by their respective scan generators $V_{b1}$ and $V_{b2}$, a discrete location on each of the peaking materials will exhibit the high dielectric constant. The AC signal from generator G3D flows through the path comprising, the discrete locations in peaking materials 122*d* and 122*e*, a vertical strip electrode 118*d* which is adjacent the peaking location in peaking material 122*d* and a horizontal strip electrode 118*e* which is adjacent the peaking location in material 122*e*, and the portion of the photoconductive panel which is at the crossover point of the horizontal and vertical strip electrodes, and the impedance ZD. Since the impedance of the photoconductive material at any point is proportional to the light intensity at that point, the strength of he AC signal across ZD will depend upon the intensity of light on the photoconductive layer at the point which is being scanned. Thus, as the entire photoconductive layer is scanned with a raster-type scan, the signal strength across ZD varies in accordance with the light intensity on the incremental areas of the PC panel. The pickup means G3A′ picks up the signal across impedance ZD and transmits the signal to some further utilization system as is common in all optical scanners. The facsimile-type transmission system, or optical scanner, of FIGURE 10 shows the versatility of a signal distribution system using a layer of material having a static electrical peaking characteristic.

Figure 11:
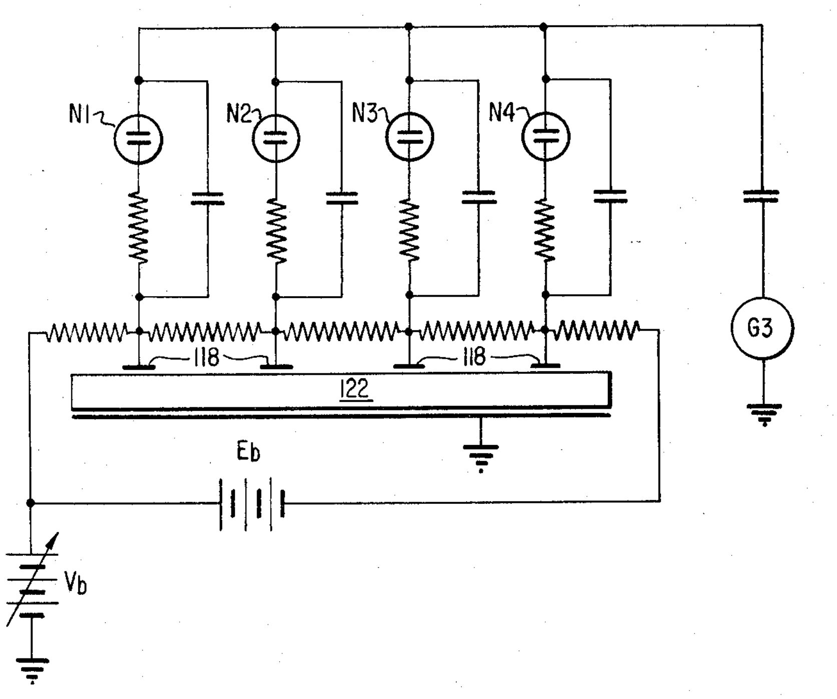
FIGURE 11 is a further embodiment of the invention.

A further embodiment, FIGURE 11, shows the use of the material, 122 having a static electrical peaking characteristic for distributing a signal to a group of neon lamps, $N_1$ through $N_4$. Whereas, in the prior figures, the utilization means was shown as an electroluminescent or photoconductive panel, in FIGURE 11, the utilization means as a group of neon lamps. The signal from generator G3 is passed through the statically electrical peaking material 122 in the same manner as explained above. As the discrete location, or peaking location of the peaking material 122 moves across the peaking material, the neon bulbs light up in succession.

Figure 12:
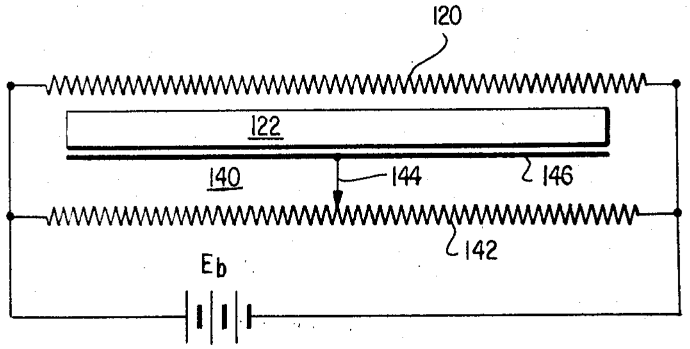
FIGURE 12 illustrates one alternative method of applying bias voltages to the material used in the invention.

In the above embodiments, the peaking material has been scanned by using a voltage $E_b$ to apply a non-zero gradient across the resistive layer and a voltage $V_b$ for raising the level of the non-zero voltage gradient. FIGURE 12 shows a different means for raising and lowering the voltage gradient applied across the resistive coating 120. In FIGURE 12, only the peaking layer 122 and the scanning mechanism are shown. Instead of using a variable voltage sourve $V_b$ to raise and lower the level of the voltage gradient, a potentiometer 140 which comprises movable contact 144 and resistance 142 act in a similar manner to raise and lower the level of the voltage gradient applied across the peaking material 122. The mechanism for sweeping shown in FIGURE 12 has usefulness, for example, in measuring applications where it is desirous to convert mechanical displacement of luminescent line displacement.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A system for distributing a signal to discrete positions on a utilization layer, said utilization layer being responsive to signals above a certain value, comprising:

(1) a first layer of material having a static electrical peaking characteristic, said characteristic peaking at a discrete location therein determined by the application thereacross of a zero DC field, (2) first means for applying a non-zero energy field gradient across said first layer, said field including a zero DC field applied across only said discrete location of said first layer, (3) means for varying the level of said gradient for moving said discrete location along said first layer, (4) signal connection means insulated from said first means for applying a signal across the combination of said first layer and said utilization layer, and (5) signal means connected to said signal connection means for causing said first layer to pass at least said certain value of signal only through said discrete location of said first layer to a discrete position determined thereby on said utilization layer.

2. The system as claimed in claim 1 wherein said utilization layer is an electroluminescent panel.

3. The system as claimed in claim 1 wherein said utilization layer is a photoconductive panel.

4. The system claimed in claim 1 wherein said first layer of material is a ferroelectric material.

5. The system claimed in claim 1 wherein said first layer of material is a layer of back-to-back diodes.

6. The system claimed in claim 1 further comprising a plurality of strip electrodes connected between said first layer and said utilization layer.

7. The system claimed in claim 1 wherein said utilization layer comprises a plurality of neon lamps.

8. A system for distributing a signal to discrete positions on a utilization layer, said utilization layer being responsive to signals above a certain value, comprising:

(1) a utilization layer, (2) a first layer of material having a static electrical peaking characteristic, said characteristic peaking at a discrete location therein defined by the application thereacross of a zero DC field, (3) a first group of strip electrodes connected to said first layer and placed in parallel relation on one side of said utilization layer, (4) first means for applying a first non-zero energy field gradient across said first layer, said field including a zero DC field applied across only said discrete location of said first layer, (5) means for varying the level of said first gradient for moving said discrete location along said first layer, (6) a second layer of material having a static electrical peaking characteristic, said characteristic peaking a discrete location therein defined by the application theracross of a zero DC field, (7) a second group of strip electrodes connected to said second layer, said second group of strip electrodes being parallel to one another and in crossed relation with said first group of strip electrodes and placed on a second side of said utilization layer, (8) second means for applying a second non-zero energy field gradient across said second layer, said field including a zero DC fiield applied across only said discrete location of said second layer, (9) means for varying the level of said second gradient for moving said discrete location along said first layer,

(10) signal connecting means, insulated from said first and second means, for connecting a signal across the combination of said first and second layers and said utilization layer, and

(11) signal means connected to said signal connection means for causing said first and second layers to pass at least said certain value of signal only through said discrete locations of said first and second layers to a discrete position on said utilization layer determined by said discrete locations on said first and second layers.

9. The system claimed in claim 8 wherein said first and second layers are layers of ferroelectric materials.

10. The system claimed in claim 8 wherein said first and second layers are layers of back-to-back diode materials.

11. The system claimed in claim 8 wherein said utilization layer comprises a layer of electroluminescent material, a layer of variable resistance material adjacent said layer of electroluminescent material and a plurality of floating electrodes embedded between said electroluminescent layer and said variable resistance layer.

12. The system claimed in claim 8 wherein said utilization layer includes a layer of photoconductive material.

13. The system claimed in claim 12 further comprising an impedance means connected in series circuit relationship with said signal means, said first and second layers, and said utilization layer, whereby the magnitude of the signal across said impedance means varies in accordance with the instantaneous impedance of said utilization layer at said discrete position.

14. The system as claimed in claim 1 wherein said first means comprises a layer of resistive material and a source of DC voltage connected between the ends of said resistive layer.

15. The system as claimed in claim 14 wherein said means for varying comprises a source of variable voltage connected between a reference potential point and one end of said resistive layer.

16. The system as claimed in claim 15 wherein said signal connection means comprises a pair of electrode plates placed on opposite sides of the combination of said utilization and said first layers.

17. The system as claimed in claim 16 wherein said resistive layer is coextensive with said first layer and positioned between said first and utilization layers.

18. The system as claimed in claim 17 wherein said first layer is a ferroelectric material.

References Cited

UNITED STATES PATENTS

| | | | |
|---|---|---|---|
| 3,015,747 | 1/1962 | Rosenberg | 315—169 |
| 3,102,970 | 9/1963 | Haskell et al. | 315—169 X |
| 3,154,720 | 10/1964 | Cooperman | 315—169 |
| 3,254,267 | 5/1966 | Sack | 315—169 |
| 3,258,644 | 6/1966 | Rajchman | 315—55 |

JOHN W. CALDWELL, *Primary Examiner.*

NEIL C. READ, *Examiner.*

H. PITTS, *Assistant Examiner.*